(12) United States Patent
Kubisch

(10) Patent No.: US 9,154,951 B2
(45) Date of Patent: Oct. 6, 2015

(54) COMMUNICATION SYSTEM HAVING ACCESS CONTROL AS WELL AS METHOD FOR GRANTING ACCESS IN A COMMUNICATION SYSTEM

(71) Applicant: EADS Deutschland GmbH, Ottobrunn (DE)

(72) Inventor: Martin Kubisch, Munich (DE)

(73) Assignee: EADS DEUTSCHLAND GmbH, Ottobrunn (DE)

( * ) Notice: Subject to any disclaimer, the term of this patent is extended or adjusted under 35 U.S.C. 154(b) by 0 days.

(21) Appl. No.: 14/294,678

(22) Filed: Jun. 3, 2014

(65) Prior Publication Data

US 2014/0359724 A1    Dec. 4, 2014

(30) Foreign Application Priority Data

Jun. 4, 2013   (DE) .......................... 10 2013 105 746

(51) Int. Cl.
*G06F 7/04* (2006.01)
*H04W 12/06* (2009.01)
*H04L 29/06* (2006.01)
*H04L 29/08* (2006.01)

(52) U.S. Cl.
CPC ............... *H04W 12/06* (2013.01); *H04L 63/10* (2013.01); *H04L 63/18* (2013.01); *H04L 67/12* (2013.01); *H04L 69/18* (2013.01)

(58) Field of Classification Search
CPC ....... H04W 12/06; H04L 63/18; H04L 63/08; H04L 63/083; H04L 63/10; H04L 63/107; H04L 67/12; H04L 69/18
USPC ............................................................ 726/5
See application file for complete search history.

(56) References Cited

U.S. PATENT DOCUMENTS

| 8,495,722 | B1* | 7/2013 | McCusker ...................... 726/10 |
| 2006/0168647 | A1 | 7/2006 | Chiloyan |
| 2010/0105329 | A1 | 4/2010 | Durand et al. |
| 2013/0074162 | A1 | 3/2013 | Falk |

FOREIGN PATENT DOCUMENTS

| DE | 10 2010 021 256 A1 | 11/2011 |
| DE | 10 2012 020 900 A1 | 4/2013 |

(Continued)

OTHER PUBLICATIONS

The European Search Report for the corresponding European application No. 14170938.6, issued on Nov. 3, 2014.

(Continued)

*Primary Examiner* — Kambiz Zand
*Assistant Examiner* — Abiy Getachew
(74) *Attorney, Agent, or Firm* — Global IP Counselors, LLP

(57) ABSTRACT

A communication system includes a first wireless communication device for providing communication access for a mobile computer device in a first communication area. The first wireless communication device comprises an access control system for granting access based on authentication information known by the mobile computer device. A second communication device provides the authentication information for the mobile computer device. Furthermore, the invention relates to a method for granting access, executable by the communication system mentioned above, as well as to a maintenance system and/or an aircraft having such communication system.

20 Claims, 2 Drawing Sheets

(56) References Cited

FOREIGN PATENT DOCUMENTS

| EP | 2 500 870 A1 | 9/2012 |
| WO | 2013013243 A1 | 1/2013 |

OTHER PUBLICATIONS

Ward Chirs: InstaWifi-Connect to Wi-Fi using NFC or QR code. Jun. 14, 2012 URL: http://blog.clove.co.uk/2012/06/14instawificonnect-to-wi-fi-using-nfc-or-qr-code.

NFC Forum, Bluetooth Special Insterest Group: Bluetooth Secure Simple Pairing Using NFC—Application Document. Oct. 18, 2011 URL: http://www.nfc-forum.org/resources/AppDocs/NFCForum_AD_BTSSP_1_0.pdf.

Swoboda, J.; Spitz, S.; Pramateftakis, M.: Kryptographie und IT-Sicherheit, 2008.

German Office Action for the corresponding German application No. 10 2013 105 746.2, issued on Jan. 7, 2014.

\* cited by examiner

COMMUNICATION SYSTEM HAVING ACCESS CONTROL AS WELL AS METHOD FOR GRANTING ACCESS IN A COMMUNICATION SYSTEM

CROSS-REFERENCE TO RELATED APPLICATION

This application claims priority under 35 U.S.C. §119(a) to German Patent Application No. 10 2013 105 746.2, filed on Jun. 4, 2013, the entire contents of German Patent Application No. 10 2013 105 746.2 are hereby incorporated herein by reference.

BACKGROUND

1. Field of the Invention

The invention relates to a communication system having a first wireless communication device for providing communication access for a mobile computer device in a first communication area. The first wireless communication device has an access control system for granting access based on authentication information known by the mobile computer device. Furthermore, the invention relates to a method for granting access to such communication system, wherein authentication information is received from a mobile computer device, is checked and, if the authentication information will be correct, access is granted to the communication system. The invention also relates to an aircraft and/or a maintenance system having such communication system and/or for performing the method.

2. Background Information

External service units/computer device for the maintenance of mobile and immobile entities require connection to the system to be maintained. In this way, it is intended to ensure that access is authorised. Conventionally this is achieved by realising connection to the system which is to be maintained, in a protected and access-restricted area (basement, cockpit). On the one hand, use of wireless ambient communication (WLAN, ZigBee) simplifies connection of the external maintenance device, but on the other hand eliminates inherent combination of connection point and access restriction.

WPA2 and the RADIUS Standard (802.1X) are for example known as an apparatus authentication method. Most of the authentication methods are based on the fact that secret authentication information is known by a wireless communication computer device.

SUMMARY

An object of the invention is to improve a communication system of the type mentioned above such that any authentication information may safely be transmitted to the computer device by the communication system.

Thus, the disclosed embodiments provide a communication system which comprises a second communication device for providing the mobile computer device with authentication information.

Such a communication system allows arrangement of the second communication device in a protected area such that authentication information is exclusively transmitted to a computer device having access to that protected area. No input of authentication information into the mobile computer device is required by the user of the mobile computer device, thereby reducing operating errors.

The second communication device may be a wireless communication device, wherein the second communication device has a second communication area, which is smaller than the first communication area. It is advantageous for the transmitting power of the second communication device to be reduced with respect to the transmitting power of the first communication device. Therefore, for receiving the authentication information the mobile computer device is required to be located in a comparably narrow area.

The second communication device may be wire-bound. Consequently, connecting the mobile computer device and receiving authentication information is only possible at a physical access location, which may easily be protected. The communication system may comprise an authentication information memory for recording valid authentication information, which is readable by the first and second communication device. The second communication device may thereby provide current authentication information, which is accepted by the first communication device or the access control system thereof, respectively.

Advantageously, the second communication area will not exceed any protected access space. Consequently, physical presence of the mobile computer device in that space is required. In this way, it may easily be understood, which computer device will receive access authorization.

The communication system may comprise a terminal for user identification. In this way, is it possible to perform a two-factor authentication, for example by requiring PIN input or an identification card in addition to the presence of the mobile computer device.

Furthermore, certain disclosed embodiments include step of transmitting authentication information via a second communication device.

Provision may be made for the second communication area of the second communication device to be set such that the second communication area is smaller than the first communication area. In this way, possibility of receiving the authentication information will be restricted to a physically limited area.

Moreover, provision may be made for the authentication information to be transmitted not before verification of access authorization is transmitted via a terminal device. Access authorisation may be verified by entering a personnel identification code into the terminal device and/or reading data from an identification card by the terminal device. By way of such two-factor authentication safety of the communication system is increased.

Certain disclosed embodiments provide an aircraft having such communication system as well as by a communication system for performing the above-mentioned method.

DESCRIPTION OF THE DRAWINGS

In the following, the invention will be explained in detail by way of exemplary embodiments, which are schematically represented in the accompanying figures, wherein.

DETAILED DESCRIPTION OF EMBODIMENTS

Figure 1:
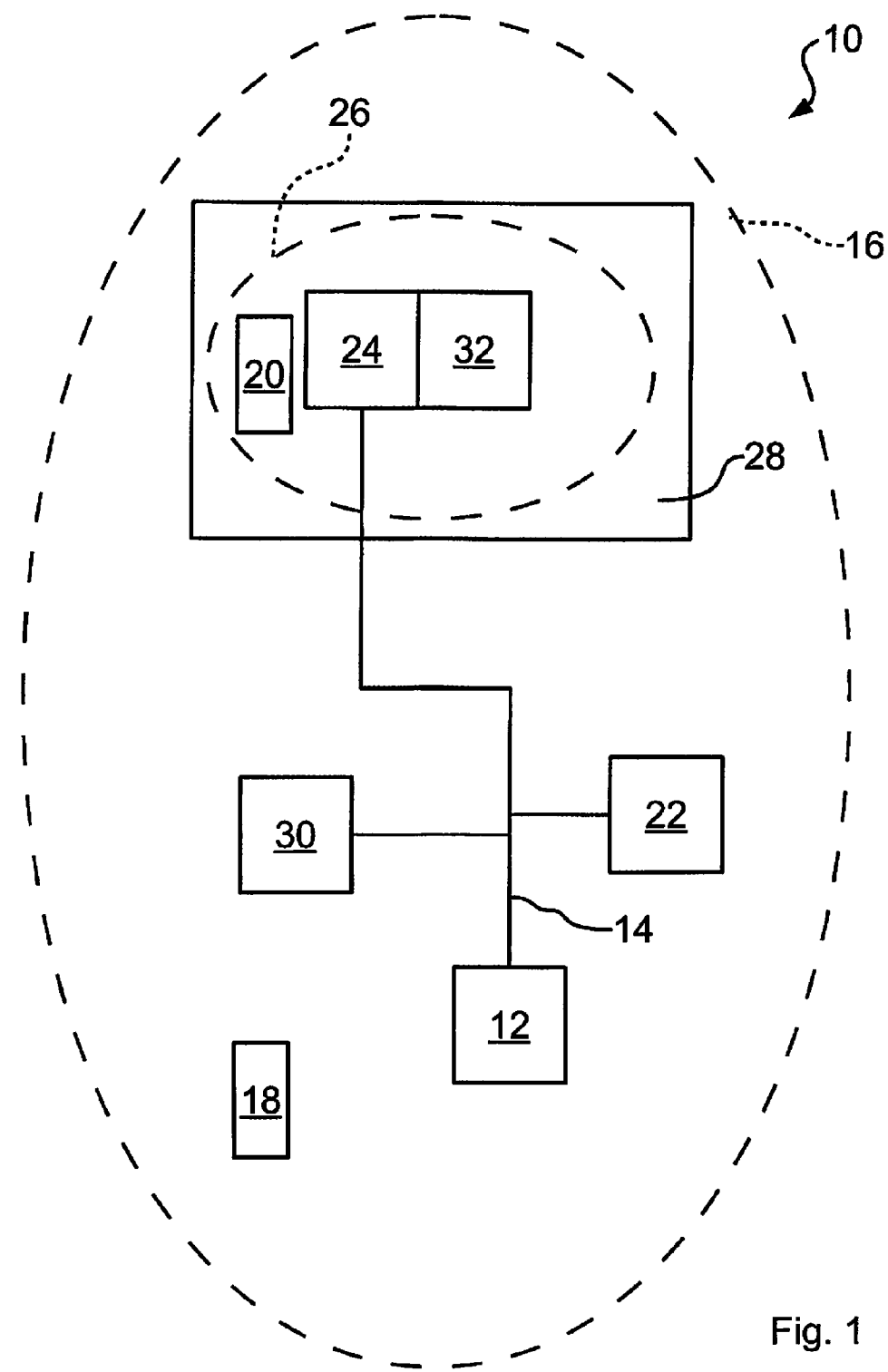
FIG. 1 is an overview over a first embodiment of the present invention.

FIG. 1 represents a communication system 10 having a first communication device 12. The first communication device 12 provides a network 14 with the wireless communication access. Different computer systems may be connected to the network 14, which may fulfill different functions.

The first communication device 12, which is formed as a WLAN access, comprises a first communication area 16, where a mobile computer device 18, 20 may communicate with it. In the case under consideration, the first communication area 16 is limited by the transmitting and receiving power of the first communication device 12 as well as of the mobile computer device 18, 20.

The first communication device 12 comprises an access control system (not shown) making decision whether access to the first communication device 12 is granted to a mobile computer device 18, 20. Such access control system may be implemented in different ways. In the case under consideration, an authentication information, which is for the encryption of data transfer between the mobile computer device 18, 20 and the first communication device 12, is required to be known by the mobile computer device 18, 20. In the context of encrypting WPA2, this authentication information is a certificate or a password.

If the certificate or the password is not known by the mobile computer device 18, 20, then it is not able to transmit to or receive correctly encrypted data from the first communication device 12. In this way, access to the first communication device 12 is effectively refused.

There is a plurality of other methods for authentication, which each are based on the fact that an authentication information is known by the mobile computer device 18, 20, if it is authorised to access.

The communication system 10 comprises an authentication information memory 22 for recording valid authentication information. Communication devices 12, which are connected, may access the authentication information memory 22 via the network 14 and in this way may determine, which authentication information will be valid.

In specific situations, permanent access to the first communication device 12 is not intended to be granted to a mobile computer device 18, 20. This for example applies to maintenance systems, in which access is intended to be granted to mobile diagnostic apparatuses solely for the maintenance time, since it is intended that they are used for the maintenance of different systems. For such a maintenance time temporary authentication information is generated which is transmitted to the mobile computer device 18, 20. For the generation of this temporary authentication information the communication system 10 comprises an authentication information generating device 30. The authentication information generating device 30 generates authentication information, which for example is to be deposited in the authentication information memory 22.

For transmitting temporary authentication information the communication system 10 comprises a second communication device 24 having a second communication area 26. If the mobile computer device 18, 20 is in the second communication area 26, then it may request authentication information from the second communication device 24 in order to access the first communication device 12.

In order to transmit this temporary authentication information solely to the mobile computer device 18, 20, which actually is involved in maintenance, the second communication area 26 is smaller than the first communication area 16 and is arranged in a secure area 28, which is only accessible for authorised persons, especially for maintenance personnel. In an aircraft, a suitable area 28 would be the cockpit.

Since the mobile computer device 20 is in the secured area 28, and is also in the second communication area 26, it is assumed that access to the first communication device 12 is also granted to the computer device 20. The mobile computer device 18, which is not in the second communication area 26, is not able to request authentication information, since it is not able to receive messages from the second communication device 24.

In addition to the requirement to have access to the secured area 28 release of the authentication information is linked to activation by a terminal device 32. The terminal device 32 requests additional identification, for example a pincode or personnel identification badge. For this purpose the terminal device 32 may have a keyboard and/or a card reader. Authentication information will not be transmitted to the mobile computer device 20 before having successfully completed this additional identification.

However, release of the authentication information by the terminal device 32 is not essential, so that the terminal device 32 is substantially not required.

Wireless systems are used in aerospace industry, but due to safety requirements (protection from unauthorised intervention), they are mostly realised merely as a reading access to measuring systems (tire pressure, high lift torque limiter). In building services engineering, such systems are also used as mere reading systems, for example for reading electricity and heating costs.

Figure 2:
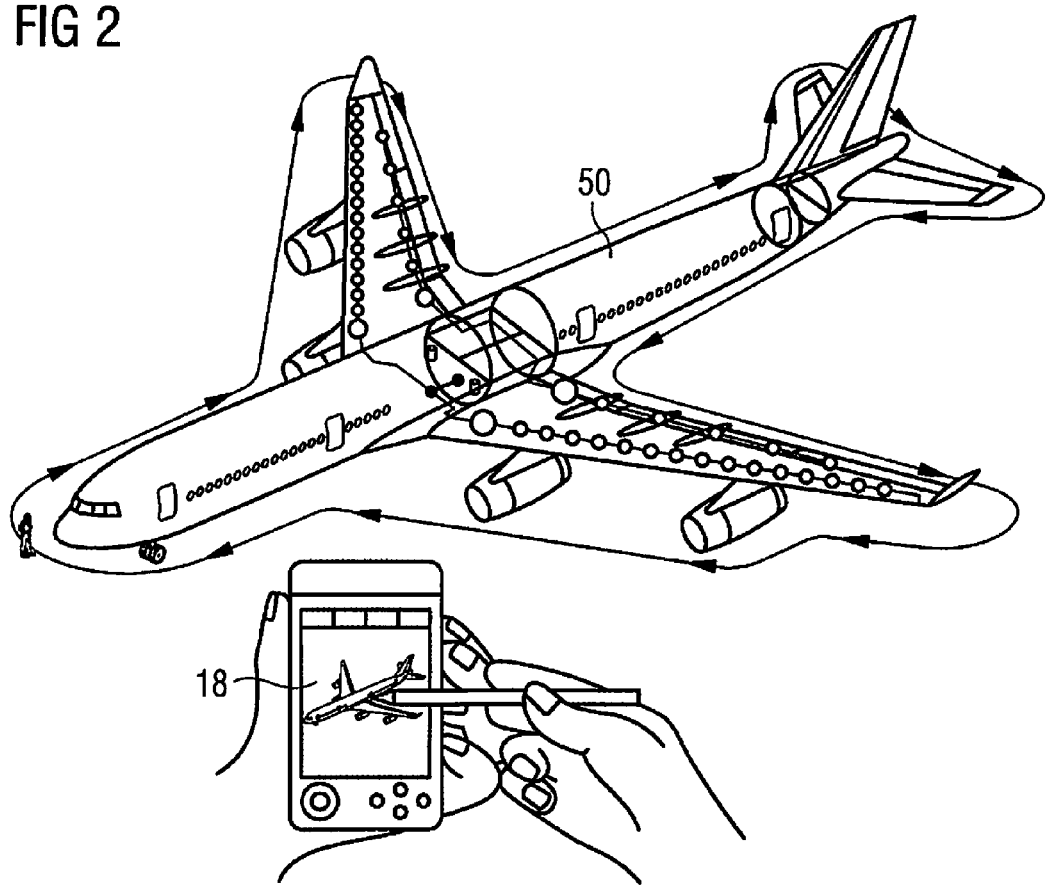
FIG. 2 is an overview over a second embodiment of the present invention.

Maintenance and repair of mobile and immobile entities (e.g. airplane, car, train, houses) may be simplified by the use of wireless equipment. FIG. 2 represents this fact for the maintenance of an airplane 50. The airplane 50 is provided with a first communication device in the form of a wireless connection point 12 and a maintenance technician may perform status queries or maintenance functions with the help of a wireless device in the form of a mobile computer device 18—from any position at or in the airplane 50.

Consequently he no longer depends on direct reading the status from the source (e.g. gear in wing) or to synchronize with additional personnel in the cockpit for gear turning off and on. FIG. 2 represents access of a wireless device 18 to the wireless connection point 12 of the airplane 50 e.g. via IEEE802.11.

Conventionally, exclusive and safe utilisation of status queries and maintenance functions is achieved in that connection to the system to be maintained is performed in a wire-bound manner in a protected and access-restricted area of the maintenance object (connection of a plug in the basement, under the hood or in the driver cabin). However, use of wireless devices 18 eliminates inherent combination of connection point and access restriction.

The use of wireless devices 18 therefore requires solely wireless devices 18 to be allowed to connect to the wireless connection point 12 in order to access status information and maintenance functions of the maintenance objects. It is essential that this will only be allowed for a limited period of time (maintenance session).

The present invention resides in that use is made of the presence of an access-restricted area 28 in order to, at that location, authorize wireless devices 18 at a second communication device in the form of an authorization point 24 having wireless near-field communication (e.g. NFC, RFID, infrared) and to grant access to them to the wireless connection point 12 for a maintenance session.

Figure 3:
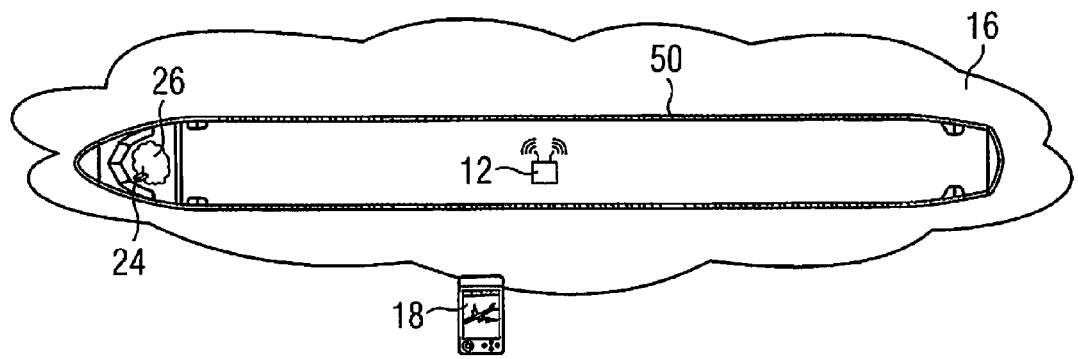
FIG. 3 is an arrangement of the components of the second embodiment.

In an airplane, the access-limited area may e.g. be the cockpit 28 or the cargo area. In FIG. 3, the cockpit 28 is represented by an access-limited area having wireless authorization point 24.

The mobile computer device 18 constitutes an external maintenance device, which is provided with two types of wireless interfaces, as is the system to be maintained. An interface for the near-field (for example NFC, RFID) and one (or more) wireless interfaces for the wireless ambient communication (for example WLAN). The near-field interface exclusively is located in a protected and access-restricted area 28 (cockpit, enclosed basement compartment, car interior). First, the session code ("session key") is transmitted via the near-field interface, which then enables the external maintenance device 18 to contact the maintenance system via the wireless ambient communication.

Before the wireless device 18 may become connected to the wireless connection point 12 it must get knowledge of the key for the maintenance session via the authorisation point 24 in the access-restricted area 28. After completion of the maintenance session, the wireless connection point 12 invalidates the key and terminates connection to the wireless device 18. The wireless device 18 may not access control data and maintenance functions of the maintenance object before new authorisation and receipt of a new key.

The advantages of the present invention comprise the fact that the external maintenance device 18 will no longer be localized. In this way, a service technician will be able to perform operations (for example starting a heater pump) and simultaneously will be able to watch the effect at the remote heater. Moreover, no elaborate configuration of the access authorisation of the ambient communication will be required.

The system safety may be re-established via the near-field interface by a software update of the external maintenance device 18. In the secured area there may be provided an additional safety device, for example in the form of a terminal device 32, for example in the form of an input device for a PIN code or of a card reader for a company ID.

The second communication area 26 may thereby be reduced such that a transmitting power of the second communication device is reduced. Moreover, it will be enabled for the second communication area 26 to be modified such that an antenna of the second communication device 24 will have a specified form or such that screening devices, limiting a transmission and/or receiving area of the second communication device 24, will be provided.

The first communication device 12 may not only be based on IEEE802.11 (WLAN), but on any wireless standard (for example ZigBee or Bluetooth).

The authentication information memory 22 as well as the authentication information generating device 30 are shown as separate devices connected via the networks 24 to the communication devices 12, 24. It is also possible to provide the authentication information memory 22 and/or the authentication information generating device 30 as a shared device. Moreover, the authentication information memory 22 and/or the authentication information generating device 30 may be integrated into one of the communication devices 12, 24.

In the present exemplary embodiment the communication devices 12, 24 are formed separately, but they may as well be integrated into a single communication device. The second communication device 24 may be arranged exterior of the first communication area 16.

The authentication information memory 22 may provide for authentication information to become invalid or to be deleted after a specified period of time has elapsed. Moreover, the authentication information memory 22 may provide for temporary authentication information generated for a maintenance to be able to be deleted on request at the end of a maintenance.

The present invention enables access control to a wireless network in an easy and simple manner, the access control being simultaneously both easily operable and reliable.

What is claimed is:

1. A communication system comprising:
a first wireless communication device disposed in a first communication area within a a boundaried area and including an access control device configured to grant access by a mobile computer device to the first wireless communication device based on authentication information known by the mobile computer device while the mobile computer device is in the first communication area; and
a second communication device disposed in a second communication area that is within the boundaried area and distinct from the first communication area, the second communication device being configured to authorize access by the mobile computer device to the first wireless communication device when the mobile computer device is in the second communication area.

2. The communication system according to claim 1, wherein
the second communication device includes a wireless communication device, and the second communication area is smaller than the first communication area.

3. The communication system according to claim 2, wherein
transmitting power of the second communication device is reduced with respect to a transmitting power of the first communication device.

4. The communication device according to claim 1, wherein the second communication device is wire-bound.

5. The communication system according to claim 1, further comprising
an authentication information memory configured to record valid authentication information, which is readable by the first and the second communication devices.

6. The communication system according to claim 1, wherein the second communication area does not exceed a secured area that is secured to access from the first communication area.

7. The communication system according to claim 1, wherein
the second communication device includes a terminal device configured to identify a user.

8. A method for granting access to a communication system which has a first wireless communication device disposed in a first communication area within a boundaried area, the method comprising:
operating the first wireless communication device to grant access to the communication system by a mobile computer device via the first wireless communication device based on authentication information known by the mobile computer device while the mobile computer device is in the first communication area; and
operating a second communication device, disposed in a second communication area that is within the boundaried area and distinct from the first communication area, to authorize access by the mobile computer device to the communication system via the first wireless communication device when the mobile computer device is in the second communication area.

9. The method according to claim 8, further comprising setting the second communication area to a size smaller than the first communication area.

10. The method according to claim 8, further comprising wherein
the operating of the second communication device to authorize access by the mobile computer device to the communication system via the first wireless communication device includes transmitting authentication information to the mobile computer device after an access authorization via a terminal device has been verified.

11. The method according to claim 10, further comprising verifying the access authorization by entering a personal identification code into the terminal device.

12. The method according to claim 10, further comprising verifying the access authorization by reading data from an identification card by the terminal device.

13. An aircraft having the communication system according to claim 1, with the boundaried area being within the aircraft.

14. A maintenance system having the communication system according to claim 1.

15. An aircraft having the maintenance system according to claim 14, with the boundaried area being within the aircraft.

16. An aircraft configured to perform the method according to claim 8, with the boundaried area being within the aircraft.

17. A maintenance system configured to perform the method according to claim 8.

18. An aircraft having the maintenance system according to claim 17, with the boundaried area being within the aircraft.

19. The communication system according to claim 1, wherein
the first wireless communication device being unable to grant access to the second communication device by the mobile computer device.

20. The method according to claim 8, further comprising operating the first wireless communication device to refrain from authorizing access by the mobile computer device to the communication system via the second communication device.

\* \* \* \* \*